United States Patent
Lei et al.

(10) Patent No.: US 11,115,924 B2
(45) Date of Patent: Sep. 7, 2021

(54) METHODS AND APPARATUS FOR TRANSMISSION AND DETECTION OF MULTI-BAND WAKE-UP

(71) Applicant: QUALCOMM Incorporated, San Diego, CA (US)

(72) Inventors: Jing Lei, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 16/122,542

(22) Filed: Sep. 5, 2018

(65) Prior Publication Data
US 2019/0124595 A1    Apr. 25, 2019

Related U.S. Application Data

(60) Provisional application No. 62/574,595, filed on Oct. 19, 2017.

(51) Int. Cl.
*H04W 72/10*    (2009.01)
*H04L 5/00*     (2006.01)
(Continued)

(52) U.S. Cl.
CPC ....... *H04W 52/0216* (2013.01); *H04L 5/0044* (2013.01); *H04L 5/0048* (2013.01);
(Continued)

(58) Field of Classification Search
CPC ......... H04W 52/0216; H04W 74/0808; H04W 72/10; H04W 74/006; H04L 5/0094; H04L 5/0044
See application file for complete search history.

(56) References Cited

U.S. PATENT DOCUMENTS

| 6,101,389 A | 8/2000 | Koizumi et al. | |
| 2012/0078933 A1* | 3/2012 | Kim | H04W 72/0406 |
| | | | 707/758 |

(Continued)

FOREIGN PATENT DOCUMENTS

| WO | WO-2007019556 A1 | 2/2007 |
| WO | WO-2017028899 A1 | 2/2017 |

OTHER PUBLICATIONS

Huawei et al., "Coexistence and Channel Access for NR Unlicensed Band Operation", R1-1715581, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051339048, Retrieved from the Internet: URL: http://www.3gpp.org/ftp/Meetings_3GPP_SYNC/RAN1/Docs/[retrieved on Sep. 17, 2017], 5 pages.

(Continued)

*Primary Examiner* — Charles C Jiang
*Assistant Examiner* — Voster Preval
(74) *Attorney, Agent, or Firm* — Qualcomm Incorporated

(57) ABSTRACT

Multi-band Wake-up (MWU) signal transmission and detection is disclosed. A transmitter determines a MWU signal that indicates availability of one or more sub-bands to a first user in a serving cell, and transmits the MWU signal for the one or more sub-bands in the serving cell. A clear channel assessment (CCA) status on the one or more sub-bands that are available to the first user is carried by the payload of MWU signals. The MWU signal includes a first user identifier that identifies the first user as a targeted receiver of the MWU signal. The first user has priority over a second user to utilize the one or more sub-bands. Correspondingly, a receiver receives a MWU signal for one or more sub-bands in the serving cell, decodes a payload of the MWU signal, (Continued)

700 — Determine a MWU signal that indicates availability of one or more sub-bands to a first user in a serving cell, wherein a CCA on the one or more sub-bands that are available to the first user is clear, wherein the MWU signal includes a first user identifier that identifies the first user as a targeted receiver of the MWU signal, wherein the first user has priority over a second user in the serving cell to utilize the one or more sub-bands.

702 — Transmit the MWU signal for the one or more sub-bands in the serving cell.

and determines availability of the one or more sub-bands to the first user based on the payload of the MWU signal.

30 Claims, 11 Drawing Sheets

(51) Int. Cl.
*H04W 52/02* (2009.01)
*H04L 27/00* (2006.01)
*H04W 16/14* (2009.01)
*H04W 74/08* (2009.01)
*H04W 74/00* (2009.01)

(52) U.S. Cl.
CPC .......... *H04L 5/0053* (2013.01); *H04L 5/0073* (2013.01); *H04L 5/0091* (2013.01); *H04L 5/0098* (2013.01); *H04L 27/0006* (2013.01); *H04W 16/14* (2013.01); *H04W 52/028* (2013.01); *H04W 52/0229* (2013.01); *H04W 72/10* (2013.01); *H04W 74/006* (2013.01); *H04W 74/0808* (2013.01); *H04L 5/001* (2013.01)

(56) References Cited

U.S. PATENT DOCUMENTS

| | | | |
|---|---|---|---|
| 2015/0103713 A1 | 4/2015 | Lee et al. | |
| 2016/0007368 A1 | 1/2016 | Moon et al. | |
| 2016/0266603 A1 | 9/2016 | Vajapeyam et al. | |
| 2017/0223677 A1* | 8/2017 | Dinan | H04L 27/0006 |
| 2018/0220485 A1* | 8/2018 | Su | H04W 72/04 |
| 2018/0255576 A1* | 9/2018 | Bhorkar | H04L 5/001 |
| 2018/0279289 A1* | 9/2018 | Islam | H04W 72/0446 |
| 2018/0302901 A1* | 10/2018 | Suh | H04L 27/26025 |
| 2018/0310334 A1* | 10/2018 | Mukherjee | H04L 5/0053 |
| 2019/0075581 A1* | 3/2019 | Salem | H04W 74/006 |
| 2019/0140801 A1 | 5/2019 | Ko et al. | |
| 2019/0261255 A1 | 8/2019 | You | |
| 2020/0009345 A1 | 1/2020 | Wells et al. | |
| 2020/0119894 A1* | 4/2020 | Jia | H04L 5/00 |
| 2020/0245303 A1* | 7/2020 | Hwang | H04W 72/04 |

OTHER PUBLICATIONS

CATT: "UE Power Saving and Wakeup Mechanism," 3GPP Draft; RP-171881_NR_POWERSAVING_WAKEUP, 3rd Generation Partnership Project (3GPP), Mobile Competence Centre; 650, Route Des Lucioles; F-06921 Sophia-Antipolis Cedex; France, vol. TSG RAN, No. Sapporo, Japan; Sep. 11, 2017-Sep. 14, 2017, Sep. 10, 2017, XP051324448, 7 pages, Retrieved from the Internet: URL: http://www.3gpp.org/ftp/Meetings_3GPP_SYNC/RAN/Docs/ [retrieved on Sep. 10, 2017].
International Search Report and Written Opinion—PCT/US2018/049653—ISA/EPO—dated Feb. 18, 2019.

* cited by examiner

METHODS AND APPARATUS FOR TRANSMISSION AND DETECTION OF MULTI-BAND WAKE-UP

CROSS-REFERENCE TO RELATED APPLICATIONS

This application claims the benefit of U.S. Provisional Patent Application No. 62/574,595, entitled, "METHODS AND APPARATUS FOR TRANSMISSION AND DETECTION OF MULTI-BAND WAKE-UP SIGNALS," filed on Oct. 19, 2017, which is expressly incorporated by reference herein in its entirety.

BACKGROUND

Field

Aspects of the present disclosure relate generally to wireless communication systems, and more particularly, to transmission and detection of multi-band wake-up signals.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

New radio (NR) networks support scalable OFDM numerology and flexible channel bandwidth design for both a network and a UE. For example, for the frequency range of sub to six (6) GHz, a channel bandwidth may vary between five (5) MHz and one hundred (100) MHz. As a further example, for the frequency above twenty-four (24) GHz, a channel bandwidth may vary between fifty (50) MHz and four hundred (400) MHz. A wideband spectrum can be divided into multiple non-overlapping sub-bands. A network node may perform a listen before talk (LBT) procedure prior to using a certain sub-band in order to determine whether this sub-band is reserved. A sub-band based LBT may maximize a re-use factor of radio resources. The transmission opportunity (TxOP) after each LBT may be associated with different combinations of sub-bands. It may be beneficial for both a desirable user and an aggressor to be timely informed of multi-band medium sharing status for efficient utilization of sub-bands in unlicensed spectrum.

SUMMARY

In one aspect of the present disclosure, a method of wireless communication is provided. The method includes determining a multi-band wake-up (MWU) signal that indicates availability of one or more sub-bands to a first user in a serving cell, a clear channel assessment (CCA) on the one or more sub-bands that are available to the first user being clear, the MWU signal including a first user identifier that identifies the first user as a targeted receiver of the MWU signal, the first user having priority over a second user in the serving cell to utilize the one or more sub-bands, and transmitting the MWU signal for the one or more sub-bands in the serving cell.

In an additional aspect of the present disclosure, a method of wireless communication is provided. The method includes receiving a multi-band wake-up (MWU) signal for one or more sub-bands in a serving cell that includes a first user and a second user, the MWU signal including a first user identifier that identifies the first user as a targeted receiver of the MWU signal, decoding a payload of the MWU signal, and determining availability of the one or more sub-bands to the first user in the serving cell based on the payload of the MWU signal, a clear channel assessment (CCA) on the one or more sub-bands that are available to the first user being clear, the first user having priority over the second user in the serving cell to utilize the one or more sub-bands.

In one aspect of the present disclosure, an apparatus of wireless communication is provided. The apparatus includes means for determining a multi-band wake-up (MWU) signal that indicates availability of one or more sub-bands to a first user in a serving cell, a clear channel assessment (CCA) on the one or more sub-bands that are available to the first user being clear, the MWU signal including a first user identifier that identifies the first user as a targeted receiver of the MWU signal, the first user having priority over a second user in the serving cell to utilize the one or more sub-bands, and means for transmitting the MWU signal for the one or more sub-bands in the serving cell.

In an additional aspect of the present disclosure, an apparatus of wireless communication is provided. The apparatus includes means for receiving a multi-band wake-up (MWU) signal for one or more sub-bands in a serving cell that includes a first user and a second user, the MWU signal including a first user identifier that identifies the first user as a targeted receiver of the MWU signal, means for decoding a payload of the MWU signal, and means for determining availability of the one or more sub-bands to the first user in the serving cell based on the payload of the MWU signal, a clear channel assessment (CCA) on the one or more sub-bands that are available to the first user being clear, the first user having priority over the second user in the serving cell to utilize the one or more sub-bands.

In one aspect of the disclosure, a non-transitory computer-readable medium has program code recorded thereon. The program code further includes program code executable by a computer for causing the computer to receive a multi-band wake-up (MWU) signal for one or more sub-bands in a serving cell that includes a first user and a second user, the MWU signal including a first user identifier that identifies the first user as a targeted receiver of the MWU signal, decoding a payload of the MWU signal, and to determine availability of the one or more sub-bands to the first user in the serving cell based on the payload of the MWU signal, a clear channel assessment (CCA) on the one or more sub-bands that are available to the first user being clear, the first user having priority over the second user in the serving cell to utilize the one or more sub-bands.

In an additional aspect of the disclosure, a non-transitory computer-readable medium has program code recorded thereon. The program code further includes program code executable by a computer for causing the computer to determine a multi-band wake-up (MWU) signal that indicates availability of one or more sub-bands to a first user in a serving cell, a clear channel assessment (CCA) on the one or more sub-bands that are available to the first user being clear, the MWU signal including a first user identifier that identifies the first user as a targeted receiver of the MWU signal, the first user having priority over a second user in the serving cell to utilize the one or more sub-bands, and to transmit the MWU signal for the one or more sub-bands in the serving cell.

In one aspect of the disclosure, an apparatus configured for wireless communication is disclosed. The apparatus includes at least one processor, and a memory coupled to the processor. The processor is configured to determine a multi-band wake-up (MWU) signal that indicates availability of one or more sub-bands to a first user in a serving cell, a clear channel assessment (CCA) on the one or more sub-bands that are available to the first user being clear, the MWU signal including a first user identifier that identifies the first user as a targeted receiver of the MWU signal, the first user having priority over a second user in the serving cell to utilize the one or more sub-bands, and to transmit the MWU signal for the one or more sub-bands in the serving cell.

In an additional aspect of the disclosure, an apparatus configured for wireless communication is disclosed. The apparatus includes at least one processor, and a memory coupled to the processor. The processor is configured to determine a multi-band wake-up (MWU) signal that indicates availability of one or more sub-bands to a first user in a serving cell, a clear channel assessment (CCA) on the one or more sub-bands that are available to the first user being clear, the MWU signal including a first user identifier that identifies the first user as a targeted receiver of the MWU signal, the first user having priority over a second user in the serving cell to utilize the one or more sub-bands, and to transmit the MWU signal for the one or more sub-bands in the serving cell.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
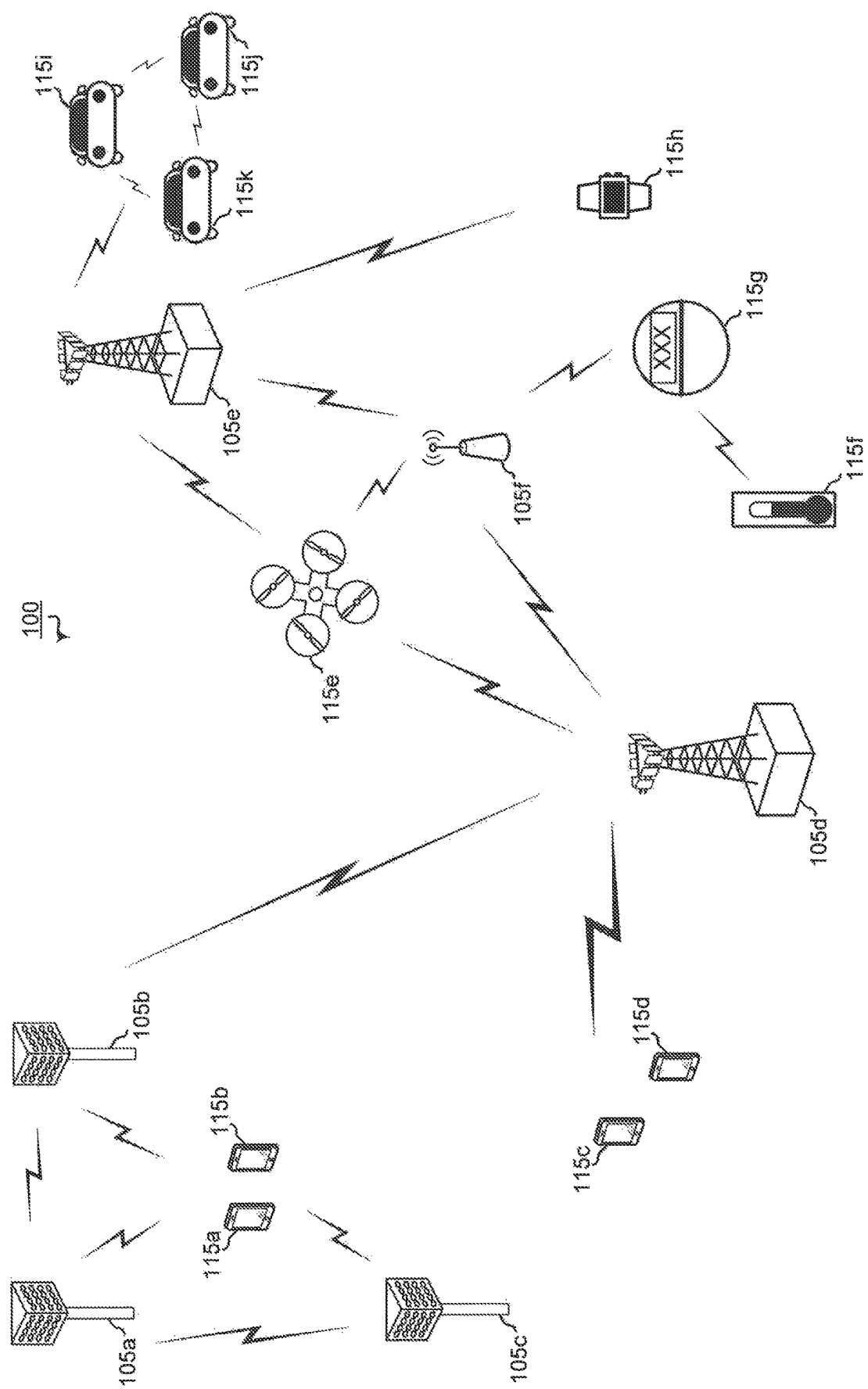
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
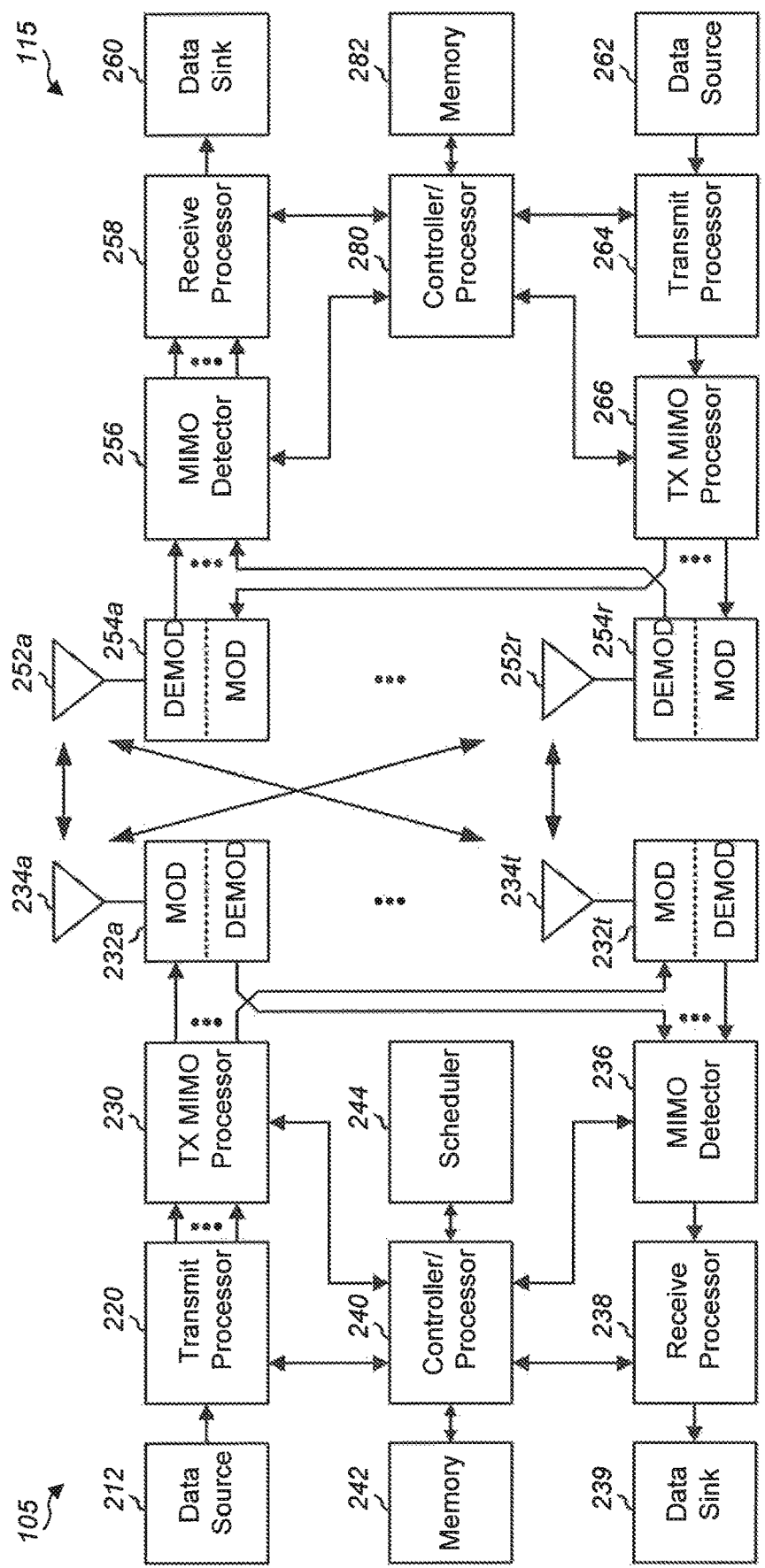
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE- MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5, 6, and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
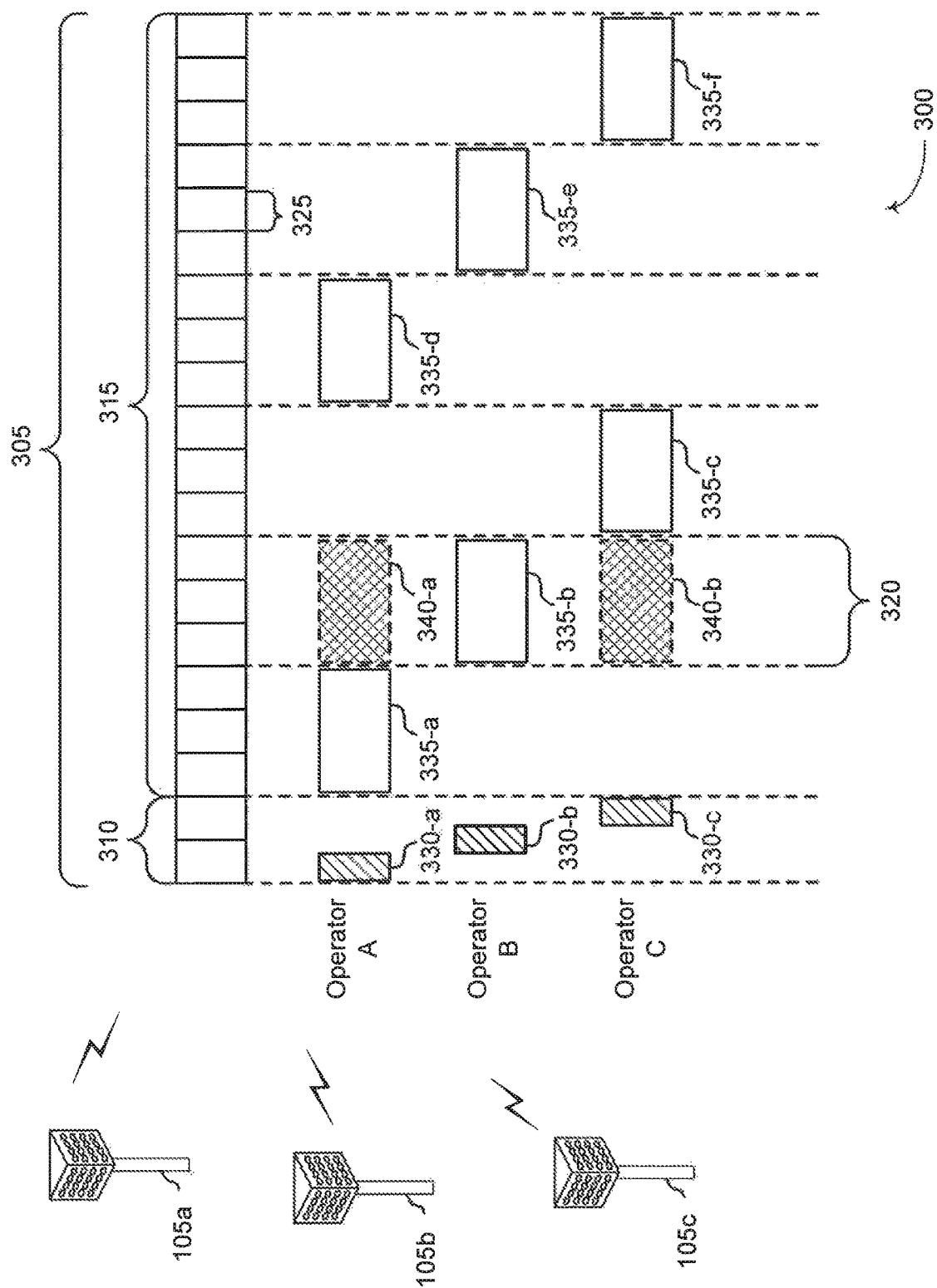
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for ongoing communications on multiple sub-bands before transmitting their own data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than one operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In NR networks, a shared radio frequency spectrum band, which may include licensed or unlicensed frequency spectrum, can be divided into multiple non-overlapping sub-bands. The multiple sub-bands can belong to different carrier frequencies, which can be contiguous, non-contiguous, or a hybrid of thereof. In an unlicensed frequency portion of the shared radio frequency spectrum band, a network node, such as a base station, a gNB, a UE, or a wireless node in the networks, may access one or more sub-bands on an opportunistic basis by performing medium sensing procedures. For example, a network node may perform a CCA in order to determine whether certain sub-bands or channels are available. The medium sensing procedures may mitigate interferences between a desirable user and an aggressor.

A desirable user may be a user that is authorized to access and utilize certain sub-bands; and an aggressor may be a user that is not authorized to access and utilize the sub-bands reserved for the desirable user or that is not given priority to access and utilize such sub-bands. Therefore, a desirable user may be also called as a prioritized user. However, a network node may not be defined as a desirable user or an aggressor permanently. For example, a network node may be a desirable user in one transmission opportunity (TxOP) utilizing certain sub-bands, but may be an aggressor in another TxOP utilizing other sub-bands. As a further example, a network node may be a desirable user in its own serving cell, but may be an aggressor for another cell.

Both a desirable user and an aggressor may benefit from an early indication of multi-band medium sharing status. They can react accordingly and save resources and power. For instance, upon knowing that certain sub-bands are reserved for a desirable user, an aggressor may refrain from transmitting signals on such sub-bands to mitigate interference. As a further instance, upon knowing availability of certain sub-bands, a desirable user may reduce its search space of PDCCH based on the knowledge of available sub-bands. Therefore, the desirable user can save power and reduce processing complexity and latency, since it does not need to search for DL/UL control information on unavailable sub-bands.

Various aspects of the present disclosure provide enhancement for early medium sharing status signaling and indication. The signaling and indication of multi-band medium sharing status, such as availability of sub-bands in unlicensed spectrum, may be different for different users. A multi-band wake-up (MWU) signal may target a desirable user and indicate availability of one or more sub-bands. On the other hand, a multi-band channel reservation (MCR) signal may target an aggressor and indicate an occupancy status of one or more sub-bands that are reserved for a desirable user. MWU and MCR signals may be scrambled with different radio network temporary identifiers (RNTIs) in order to target different users. MWU and MCR signals may be multiplexed in frequency domain and fully or partially overlap in time domain.

Further aspects of the present disclosure provide details regarding how to determine a waveform for the multiplexed MWU and MCR signals, and how to indicate availability of sub-bands in the MWU signals. MWU and MCR signals may be not needed in licensed spectrum as the resources in licensed spectrum are not allocated on an opportunistic basis.

Figure 4:
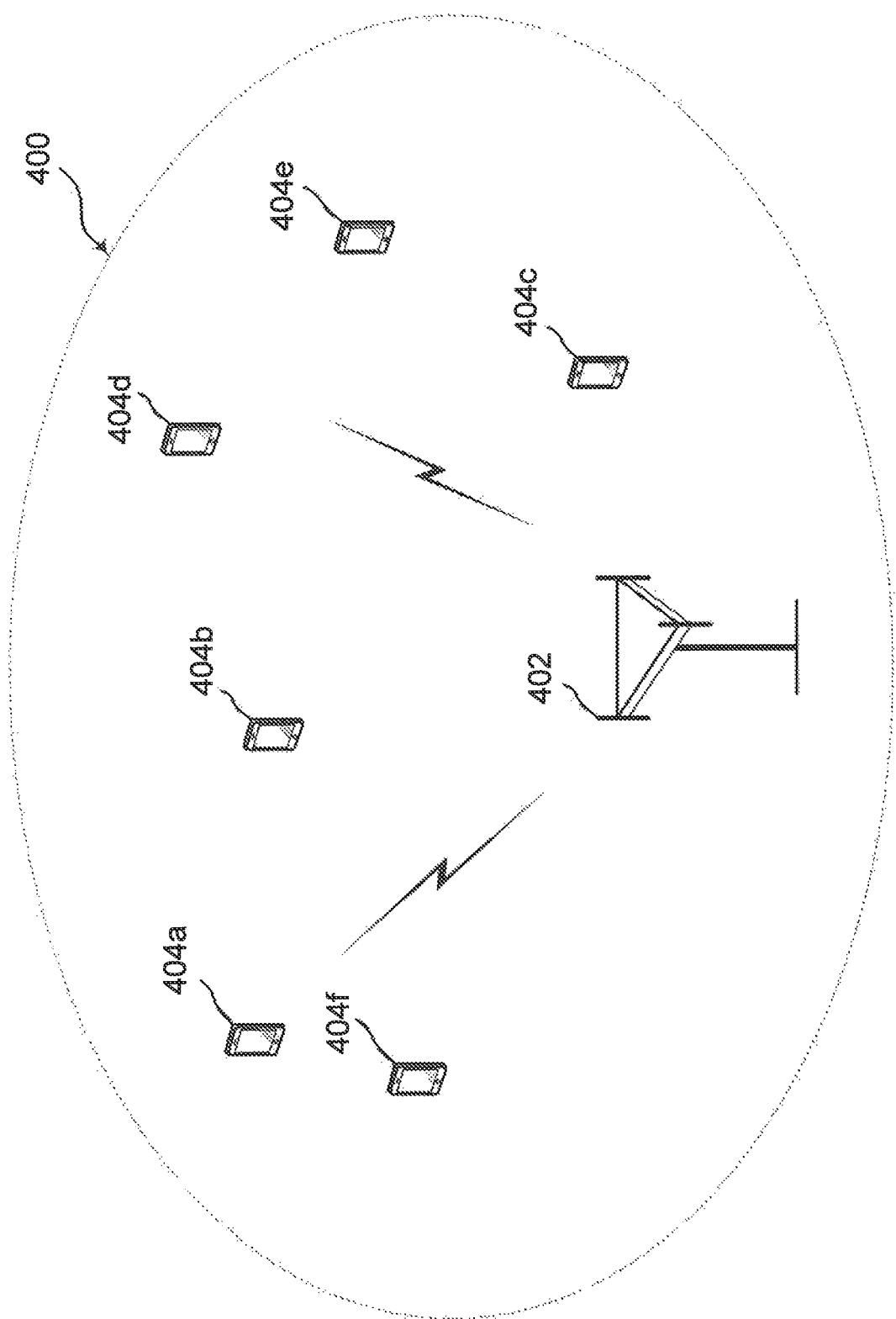
FIG. 4 is a block diagram illustrating details of a wireless communication system.

FIG. 4 is a block diagram illustrating details of a wireless communication system. In serving cell 400, base station 402 may transmit MWU signals, MCR signals, or multiplexed MWU and MCR signals to UEs 404a-f before transmitting regular control information and data traffic. Base station 402 may be an eNB, a gNB, an access point, or the like and have the same or similar configuration as the configuration of base station 105 and base station 1000 in FIGS. 1, 2, 3, and 10. UEs 404a-f may be a terminal, a mobile station, a mobile device, a subscriber unit, a station, or the like and have the same or similar configuration of UE 115 and UE 1100 in FIGS. 1, 2, 3, and 11. In some sub-bands, UEs 404a-c may be desirable users and UEs 404d-f may be aggressors in serving cell 400. In some sub-bands, UEs 404d-f may be desirable users and UEs 404a-c may be aggressors in serving cell 400. Desirable users may be given priority over aggressors to communicate using certain shared sub-bands.

Figure 5:
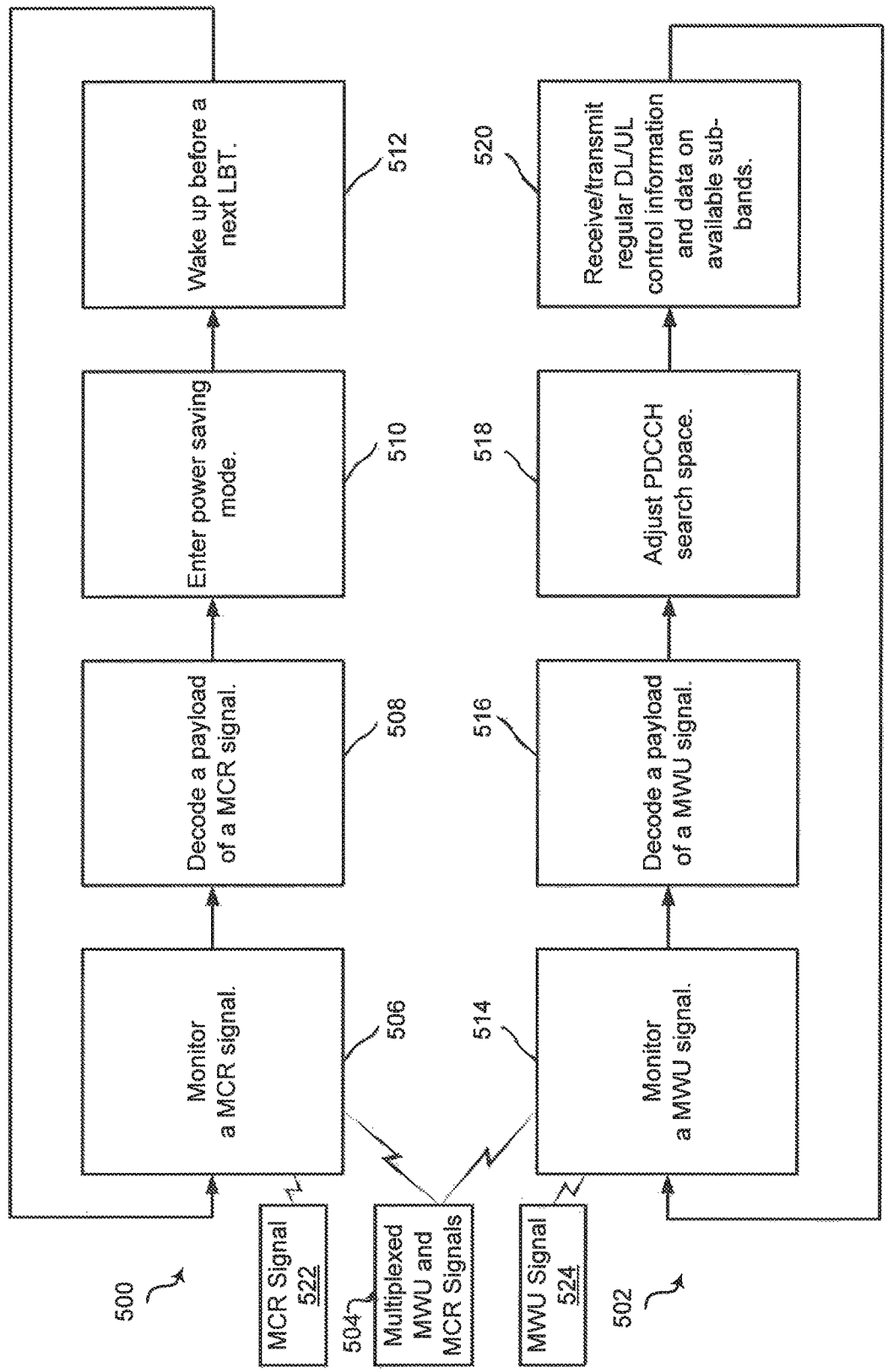
FIG. 5 is a functional block diagram illustrating exemplary blocks executed to implement procedures for processing MWU and MCR signals, respectively, according to one aspect of the present disclosure.

FIG. 5 is a functional block diagram illustrating exemplary blocks executed to implement procedures for processing MWU and MCR signals, respectively. In FIG. 5, a desirable user may follow procedure 502 to process frequency-multiplexed MWU and MCR signals 504 or MWU signal 524; and an aggressor may follow procedure 500 to process frequency-multiplexed MWU and MCR signals 504 or MCR signal 522. Procedures 500 and 502 may be performed for a TxOP in one or more LBT phases periodically or dynamically according to radio resource control (RRC). The time duration of the TxOP may be pre-configured by RRC and known by both a base station and users. The schedule of wake-up, at which users may enter a connected mode from a power-saving mode to monitor MWU signals, MCR signals, or control information, may be determined based on the TxOP configuration. In a preferred case, procedures 500 and 502 may be performed for a TxOP in each LBT phase on each sub-band.

In procedure 502, at block 514, a desirable user may monitor one or more MWU signals. The MWU signal may be transmitted or broadcast alone, such as MWU signal 524, or multiplexed with a MCR signal in frequency domain and transmitted or broadcast along with the MCR signal, such as multiplexed MWU and MCR signals 504. The MWU signal may be scrambled with a radio network temporary identifier (RNTI) of the desirable user to target the desirable user. The MCR signal may be scrambled with an RNTI of an aggressor to target the aggressor. Accordingly, the desirable user may be able to receive and process the MWU signal and disregard the MCR signal that does not target itself. RNTIs of the desirable users and aggressors may be pre-configured by an upper layer and known by both a base station and users in a serving cell in advance via a hand-shake procedure or the like.

At block 516, the desirable user may decode a payload of the MWU signal in order to retrieve information regarding availability of one or more sub-bands in a serving cell that the desirable user belongs. The one or more sub-bands that pass a CCA check may be available to the desirable user. At block 518, the desirable user may adjust PDCCH search space according to the availability of the one or more sub-bands. For example, the desirable user may avoid from searching for DL/UL control information in resources on unavailable sub-bands. At block 520, the desirable user may receive or transmit regular DL/UL control information and data traffic on the available sub-bands. Procedure 502 may repeat for a TxOP in a next LBT phase.

In procedure 500, at block 506, an aggressor may monitor one or more MCR signals. The MCR signals may be transmitted or broadcast alone, such as MCR signal 522, or multiplexed with a MWU signal in frequency domain and transmitted or broadcast along with the MWU signal, such as multiplexed MWU and MCR signals 504. The MCR signal may be scrambled with a radio network temporary identifier (RNTI) of the aggressor to target the aggressor. Accordingly, the aggressor may be able to receive and process the MCR signal and disregard the MWU signal that does not target itself.

At block 508, the aggressor may decode a payload of the MCR signal in order to retrieve information regarding an occupancy status of one or more sub-bands by a desirable user. At block 510, the aggressor may yield to the desirable user and enter a power-saving mode, such as a sleep mode, according to the information regarding the occupancy status of the one or more sub-bands. In the power-saving mode, the aggressor may refrain from utilizing the sub-bands reserved for the desirable user. At block 512, the aggressor may wake up from the power-saving mode in order to monitor MCR signals before the beginning of a next LBT phase. In some cases, the aggressor may monitor MCR signals from a base station of a serving cell of a desirable user as well as MWU signals from a base station of its own serving cell. Procedure 500 may repeat for a TxOP in a next LBT phase.

In some aspects of the present disclosure, a desirable user that performs procedure 502 in a TxOP on one sub-band may perform procedure 500 in another TxOP on another sub-band. Also, an aggressor that performs procedure 500 in a TxOP on one sub-band may perform procedure 502 in another TxOP on anther sub-band. A user may perform different procedures based on its sub-band specific category (either a desirable user or an aggressor).

Figure 6:
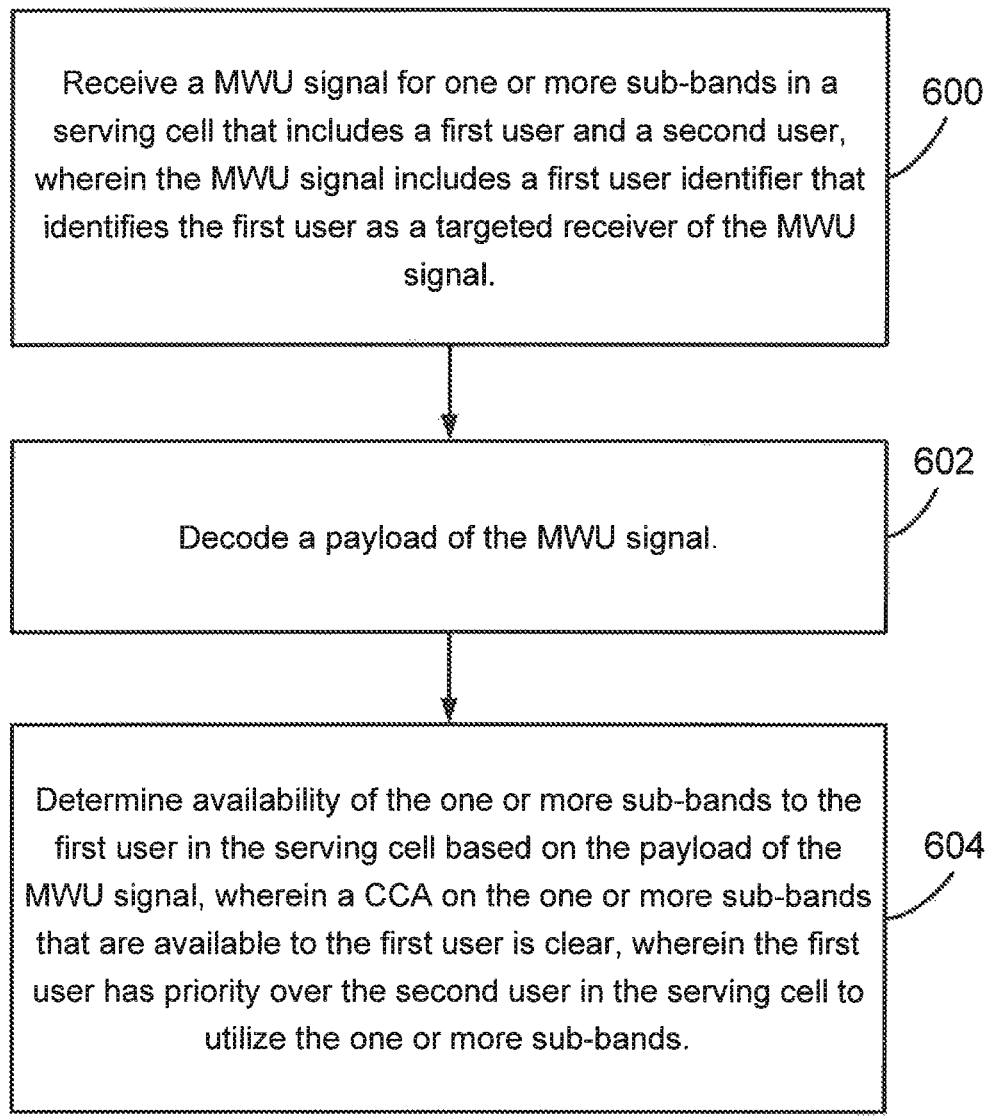
FIG. 6 is a functional block diagram illustrating exemplary blocks executed to implement one aspect of the present disclosure.

FIG. 6 is a functional block diagram illustrating exemplary blocks executed to implement one aspect of the present disclosure. The example blocks may be implemented by a desirable user, such as UE 115 or UE 1100 in FIGS. 1, 2, 3, and 11. At block 600, a MWU signal for one or more sub-bands in a serving cell that includes a first user and a second user may be received. The first user may be a desirable user. The second user may be an aggressor. The MWU signal may include a first user identifier that identifies the first user as a targeted receiver of the MWU signal. For example, the first user identifier may be a RNTI of the desirable user. At block 602, a payload of the MWU signal may be decoded. At block 604, availability of the one or more sub-bands to the first user in the serving cell may be determined based on the payload of the MWU signal. The one or more sub-bands that are indicated to be available to the first user may have a clear CCA result. The first user may have priority over the second user in the serving cell to utilize the available sub-bands.

In some aspects of the present disclosure, a desirable user may reduce PDCCH search space based on the availability of the one or more sub-bands. In another aspect of the present disclosure, the desirable user may also receive a MCR signal that is multiplexed with the MWU signal in frequency domain. However, the desirable user may disregard the received MCR signal as the MCR signal may only target an aggressor. After receiving the MWU signal or the multiplexed MWU and MCR signals, the desirable user may receive regular control information and/or data traffic on the available sub-bands. In an additional aspect of the present disclosure, the desirable user may receive the MWU signal or multiplexed MWU and MCR signals on each of the available sub-bands.

Figure 7:
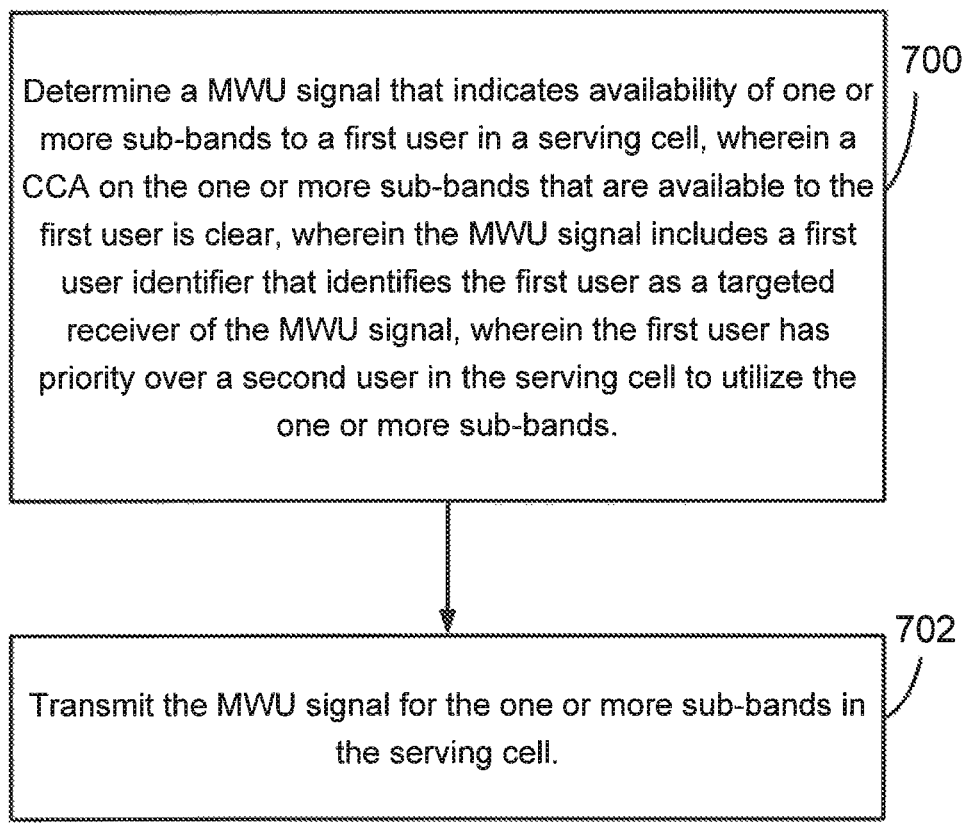
FIG. 7 is a functional block diagram illustrating exemplary blocks executed to implement one aspect of the present disclosure.

FIG. 7 is a functional block diagram illustrating exemplary blocks executed to implement one aspect of the present disclosure. The example blocks may be implemented by a base station, such as base station 105 or base station 1000 in FIGS. 1, 2, 3, and 10. At block 700, a MWU signal may be determined. The MWU signal may be determined to indicate availability of one or more sub-bands to a first user in a serving cell. A CCA on the one or more sub-bands that are available to the first user may be clear. The MWU signal may include a first user identifier that identifies the first user as a targeted receiver of the MWU signal. The first user may have priority over a second user in the serving cell to utilize the one or more sub-bands. For example, the first user may be a desirable user and the second user may be an aggressor. The first user identifier may be a RNTI of the desirable user. At block 702, the MWU signal may be transmitted for the one or more sub-bands in the serving cell.

In some aspects of the present disclosure, the base station may also transmit a MCR signal that is multiplexed with the MWU signal in frequency domain. The MCR signal may target an aggressor so that may be disregard by a desirable user. After transmitting the MWU signal or the multiplexed MWU and MCR signals, the base station may further transmit regular control information and/or data traffic on the available sub-band. In an additional aspect of the present disclosure, the base station may transmit the MWU signal or multiplexed MWU and MCR signals on each of the available sub-bands. In the case that the MCR signal is multiplexed with the MWU signal, the transmit power of both MCR and MWU signals may be considered together in order to be compliant with regulatory constraints.

MWU and MCR signals may have different configuration. A MWU signal that targets a desirable user may be synchronized with the transmission timeline of the desirable user. Therefore, an extra synchronization signal or an acquisition signal may be optional. However, a MCR signal that targets an aggressor may not be synchronized with the transmission timeline of the desirable user. As such, the MCR signal may need an additional synchronization or acquisition signal to establish timing/frequency synchronization. For example, the MCR signal may have a CR preamble in front of its payload for such purpose.

Figure 8:
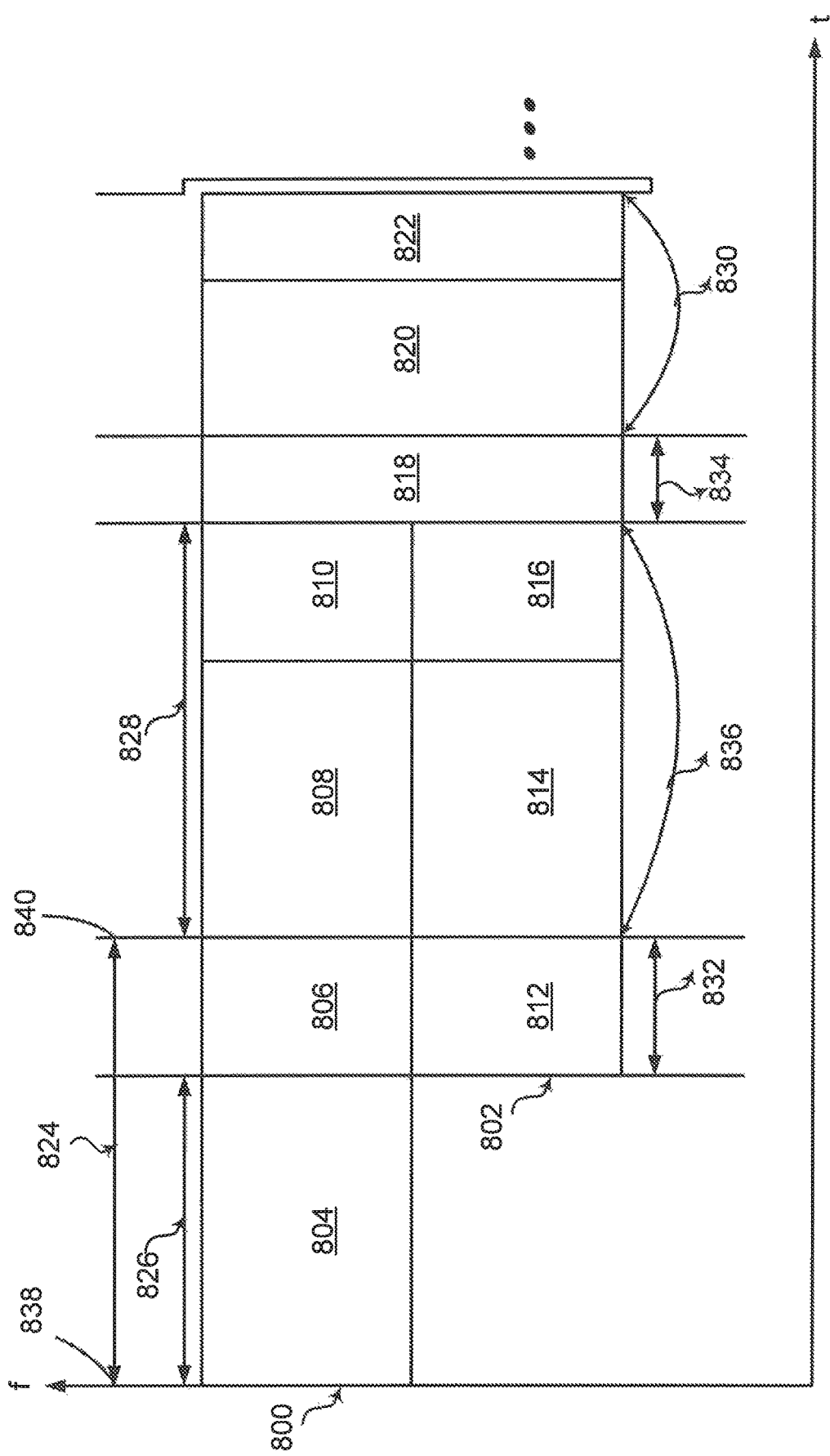
FIG. 8 illustrates a block diagram illustrating configuration of multiplexed MWU and MCR signals according to one aspect of the present disclosure.

FIG. 8 illustrates a block diagram illustrating configuration of multiplexed MWU and MCR signals according to one aspect of the present disclosure. MCR signal 800 may be multiplexed with MWU signal 802 in frequency domain. MCR signal 800 may partially overlap with MWU signal 802 in time domain. The frequency-multiplexing of MCR and MWU signals may be beneficial to reduce overall overhead of signaling. MCR signal 800 may include CR preamble 804 and payload 808. CR preamble 804 may have time duration r 826. Payload 808 may have time duration $\tau_{sym}$ 828. MWU signal 802 may include payload 814. Payload 814 may have time duration $\tau_{sym}$ 828.

In unlicensed spectrum, a base station may need time to obtain resources to transmit signals, information, or data traffic after passing a CCA check. Therefore, there may be time gap $T_G$ 824 between CCA clearance at time 838 and a start of transmission of an OFDM symbol at time 840. In order to determine a waveform for frequency-multiplexed MWU and MCR signals, this time gap, which may vary in different conditions, may be considered to construct dynamic cyclic prefixes 806 and 812 preceding OFDM symbol 836, in which payloads 808 and 814 are transmitted. For example, time duration $\tau_{DCP}$ 832 of dynamic cyclic prefixes 806 and 812 may be the difference between time gap $T_G$ 824 and CR preamble 804 and calculated by the base station. Dynamic cyclic prefix 806 may be copied from by the tail part of OFDM symbol 810. Dynamic cyclic prefix 812 may be copied from the tail part of OFDM symbol 816.

In some aspects of the present disclosure, time duration $\tau_{DCP}$ 832 of dynamic cyclic prefixes 806 and 812 may be shorter than a time duration of a normal cyclic prefix, such as $\tau_{NCP}$ 834 of normal cyclic prefix 818 of OFDM symbol 830. In OFDM symbol 830, the payload of regular control information or data traffic 820 is transmitted. Normal cyclic prefix 818 may be copied from the tail part of OFDM symbol 822. In order to avoid interference between OFDM symbols and compensate the time gap $T_G$ 824, time duration $\tau_{DCP}$ 832 of dynamic cyclic prefixes 806 and 812 may be longer than time duration $\tau_{NCP}$ 834 of normal cyclic prefix 818.

Figure 9:
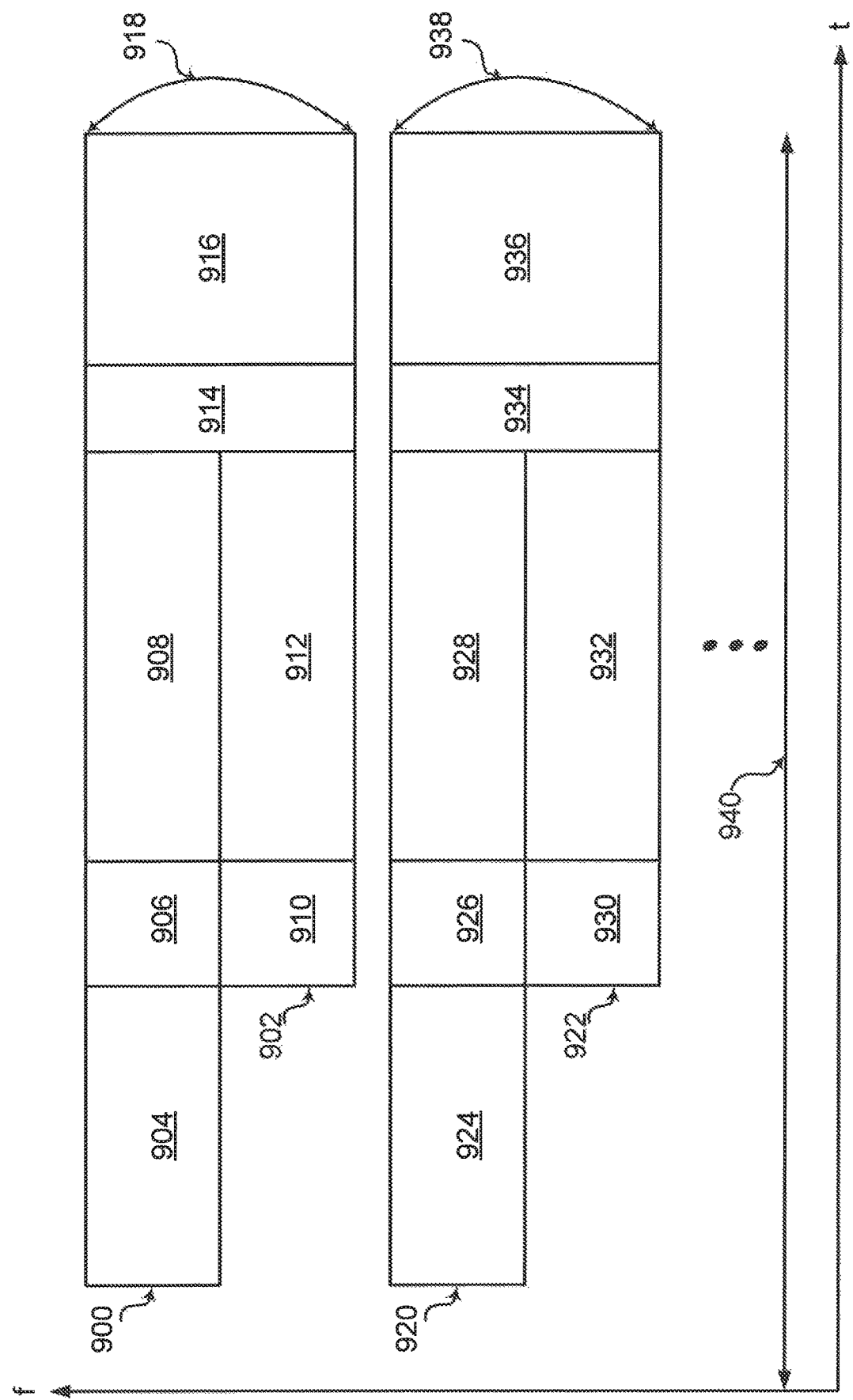
FIG. 9 illustrates a block diagram illustrating configuration of multiplexed MWU and MCR signals on multiple sub-bands according to one aspect of the present disclosure.

FIG. 9 illustrates a block diagram illustrating configuration of multiplexed MWU and MCR signals on multiple sub-bands according to one aspect of the present disclosure. In TxOP 940, MWU signals 902 and 922 and MCR signals 900 and 920 may be transmitted on multiple sub-bands, such as sub-bands 918 and 938. MWU signals 902 and 922 may be multiplexed with MCR signals 900 and 920 on sub-bands 918 and 938, respectively. On sub-band 918, MWU signal 902 may have dynamic cyclic prefix 910 and payload 912; and MCR signal 900 may have CR preamble 904, dynamic cyclic prefix 906, and payload 908. After transmissions of MCR signal 900 and MWU signal 902, the payload of regular control information or data traffic 916 and its normal cyclic prefix 914 may be transmitted. On sub-band 938, MWU signal 922 may have dynamic cyclic prefix 930 and payload 932; and MCR signal 920 may have CR preamble 924, dynamic cyclic prefix 926, and payload 928. After transmissions of MCR signal 920 and MWU signal 922, the payload of regular control information or data traffic 936 and its normal cyclic prefix 934 may be transmitted.

Availability of one or more sub-bands may be indicated in a MWU signal in various ways. For example, a MWU signal may include sub-band size information of a current sub-band on which the MWU signal is transmitted. This option may cause a small overhead and low diversity gain. However, this MWU signal may not be used to perform integrity check because it does not include information regarding availability of other sub-bands. As a further example, a MWU signal may include information regarding availability of its own sub-band and other sub-bands. This option may cause a higher overhead but improve reliability because integrity check can be performed based on availability information across sub-bands. For instance, in addition to sub-band size of its own sub-band, the MWU signal may also carry a bitmap of other available sub-bands to indicate availability of other sub-bands. Moreover, a MWU signal may include information regarding availability of a cluster of sub-bands, which may be a subset of all the sub-bands. The information may include a cluster size, a cluster index, an indicator indicating a sub-band location in the cluster of sub-bands, and a bitmap of clustered sub-bands. Further, a MWU signal may include information regarding availability of contiguous sub-bands. The information may include a length of continuous sub-bands, a location of a start of the contiguous sub-bands, and a sub-band size of a sub-band within the contiguous sub-bands.

In addition, a MWU signal may be designed for a carrier aggregation (CA) scenario. The MWU signal may include at least one component carrier (CC) index and at least one sub-band index. For example, the MWU signal may indicate that CC1 (the first CC) on 2 GHz band and CC3 (the third CC) on 6 GHz band are available. Also, the MWU signal may further indicate that certain sub-bands on CC1 and CC3 are available. For instance, the MWU signal may indicate that CC1 has 80 MHz bandwidth but only the first and the fourth 20 MHz bands are available for transmissions (assuming 80 MHz bandwidth is divided into four portions).

A base station may perform rate matching, interleaving, channel coding, modulation, and control channel resource set (Coreset) mapping on the payload of a MWU signal in order to map the MWU signal onto resource elements, and to configure the MWU search space and determine an aggregation level for the MWU signal. The format in the payload of the MWU signal may be similar to downlink control information (DCI). Therefore, in some cases, the base station may reuse the design of NR PDCCH Coreset. The MWU Coreset may include common search space. In order to avoid decoding or detecting mistakes, a MWU signal may carry limited information, such as basic information indicating the availability of sub-bands, in its payload to increase reliability and leave other detailed information to be transmitted in regular control channel or data channel.

In some aspects of the present disclosure, a channel state information-reference signal (CSI-RS) may be multiplexed with a MWU signal. Accordingly, a desirable user may perform CSI measurement and interference measurement sooner. In another aspect of the present disclosure, a pointer may be added into a MWU signal to point to different search space for users with different capabilities regarding CA. For example, a pointer may be added into a MWU signal to indicate a low-end UE without the support of CA functionality to monitor PDCCH on a given carrier frequency. As a further example, another pointer may be added into a MWU signal to indicate a relatively high-end UE with the CA functionality to monitor PDCCH on multiple carrier frequencies.

Figure 10:
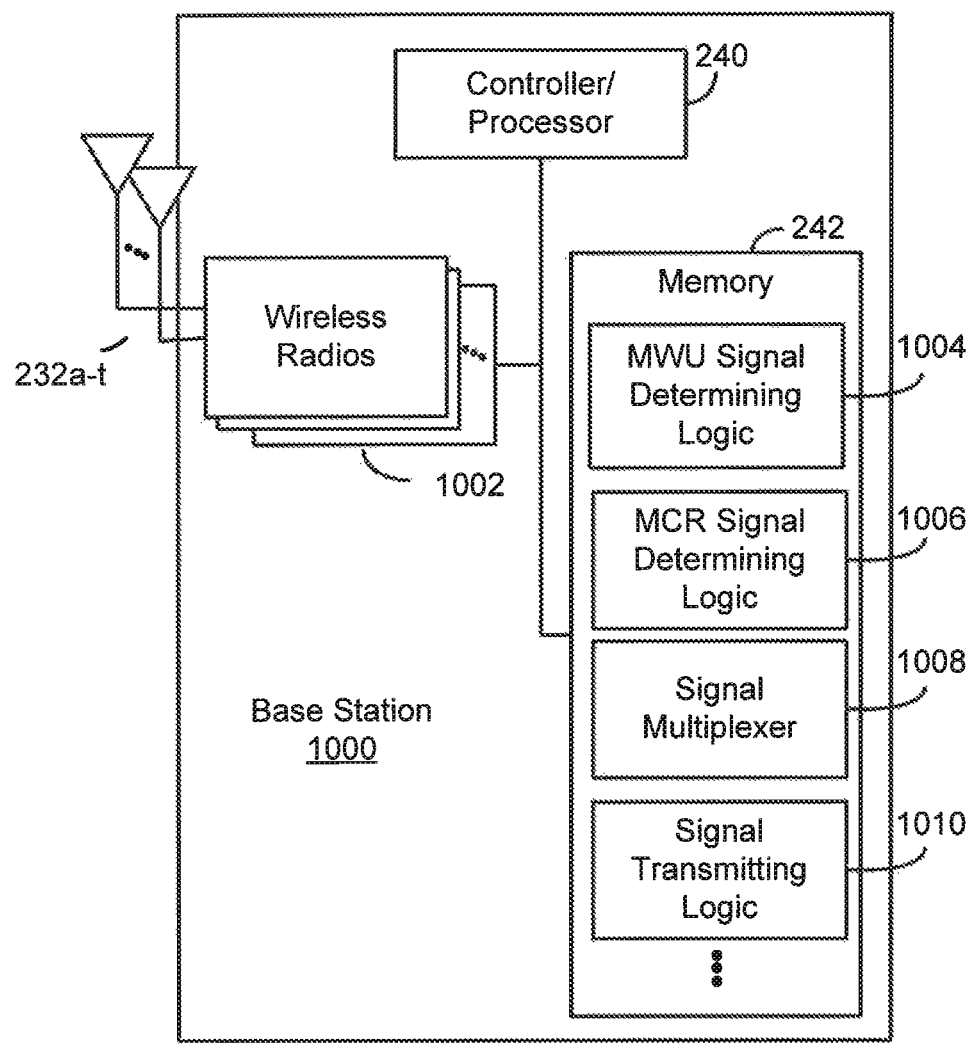
FIG. 10 is a block diagram of a base station in a communication network according to one aspect of the present disclosure.

FIG. 10 is a block diagram of base station 1000 in a communication network according to one aspect of the present disclosure. Base station 1000 may have the same or similar configuration as the configuration of base station 105 in FIGS. 1, 2, and 3. Base station 1000 may include controller/processor 240 to perform or direct the execution of various processes or program codes stored in memory 242. Base station 1000 may further include wireless radios 1002 to process uplink or downlink signals received from antennas 234a-t. Memory 242 may store program codes for execution of MWU signal determining logic 1004 and signal transmitting logic 1010. MWU signal determining logic 1004 may be used to determine a MWU signal that indicates availability of one or more sub-bands to a first user in a serving cell. Signal transmitting logic 1010 may be used to transmit the MWU signal for the one or more sub-bands in the serving cell. A CCA on the one or more sub-bands that are available to the first user may be clear. The MWU signal may include a first user identifier that identifies the first user as a targeted receiver of the MWU signal. The first user may have priority over a second user in the serving cell to utilize the one or more sub-bands. Memory 242 may further store program codes for execution of MCR signal determining logic 1006 and signal multiplexer 1008. MCR signal determining logic 1006 may be used to determine a MCR signal that indicates an occupancy status of at least one of the one or more sub-bands by the first user. The MCR signal may include a second user identifier that identifies the second user a s target receiver of the MCR signal. Signal multiplexer 1008 may be used to multiple the MWU signal with the MCR signal in frequency domain. Signal transmitting logic 1010 may be also used to transmit the multiplexed MWU and MCR signals.

Figure 11:
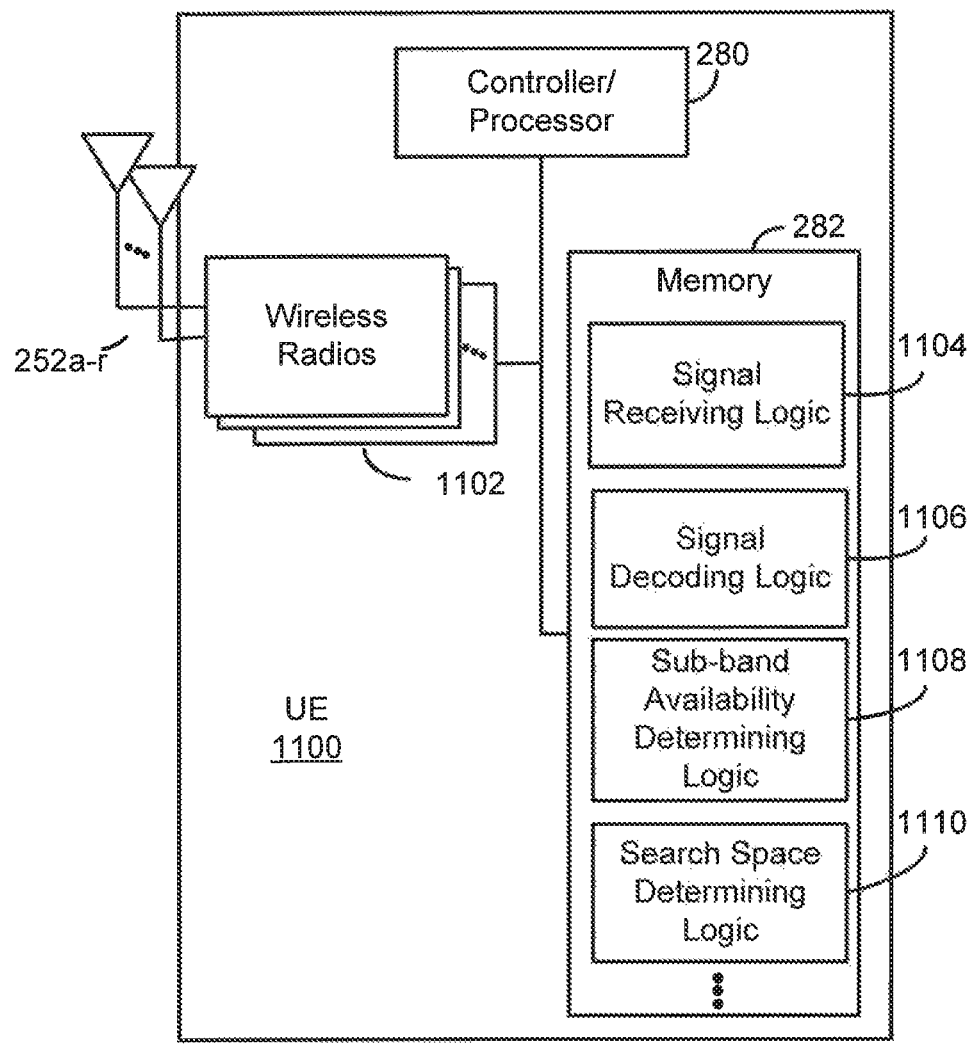
FIG. 11 is a block diagram of a user equipment in a communication network according to one aspect of the present disclosure.

FIG. 11 is a block diagram of UE 1100 in a communication network according to one aspect of the present disclosure. UE 1100 may have the same or similar configuration as the configuration of UE 115 in FIGS. 1, 2, and 3. UE 1100 may include controller/processor 280 to perform or direct the execution of various processes or program codes stored in memory 282. UE 1100 may further include wireless radios 1102 to process uplink or downlink signals received from antennas 252a-r. Memory 282 may store program codes for execution of signal receiving logic 1104, signal decoding logic 1106, and sub-band availability determining logic 1108. Signal receiving logic 1104 may be used to receive a MWU signal for one or more sub-band in a serving cell that includes a first user and a second user. The first user may be UE 1100 and the second user may be an aggressor in the serving cell. The MWU signal may include a first user identifier that identifies the first user as a targeted receiver of the MWU signal. Signal decoding logic 1106 may be used to decode a payload of the MWU signal. Sub-band availability determining logic 1108 may be used to determine availability of the one or more sub-bands to the first user in the serving cell based on the payload of the MWU signal. A CCA on the one or more sub-bands that are availability to the first user may be clear. The first user may have priority over the second user in the serving cell to utilize the one or more sub-bands. Memory 282 may further store program codes for execution of search space determining logic 1110. Search space determining logic 1110 may be used to adjust PDCCH search space based on the availability of the one or more sub-bands. The adjusting may include increase or decrease of the PDCCH search space. Signal receiving logic 1104 may be further used to receive a MWU signal that is multiplexed with a MCR signal in frequency domain. The MCR signal may indicate an occupancy status of at least one of the one or more sub-bands by the first user and includes a second user identifier identifying the second user as a targeted receiver of the MCR signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 6, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining a multi-band wake-up (MWU) signal that indicates availability of one or more sub-bands to a first user in a serving cell, wherein a clear channel assessment (CCA) on the one or more sub-bands that are available to the first user is clear, wherein the MWU signal includes a first user identifier that identifies the first user as a targeted receiver of the MWU signal, wherein the first user has priority over a second user in the serving cell to utilize the one or more sub-bands;
   transmitting the MWU signal for the one or more sub-bands in the serving cell; and
   determining a multi-band channel reservation (MCR) signal for each of the one or more sub-bands, wherein the MCR signal indicates an occupancy status of at least one of the one or more sub-bands by the first user, wherein the MCR signal includes a second user identifier that identifies the second user as a targeted receiver of the MCR signal.

2. The method of claim 1, further including multiplexing the MWU signal with the MCR signal in frequency domain.

3. The method of claim 2, further includes determining a waveform for the multiplexed MWU and MCR signals by determining a dynamic cyclic prefix (DCP) for an orthogonal frequency-division multiplexing (OFDM) symbol during which a payload of the MWU signal and a payload of the MCR signal are transmitted.

4. The method of claim 3, wherein the determining is based on a time gap between CCA clearance and a start of transmission of the OFDM symbol and a time duration of a preamble of the MCR signal.

5. The method of claim 1, further including performing a control channel resource set (Coreset) mapping based on the availability of the one or more sub-bands to the first user.

6. The method of claim 1, wherein the transmitting includes transmitting the MWU signal on each of the one or more sub-bands.

7. The method of claim 1, wherein the availability of the one or more sub-bands is indicated in a payload of the MWU signal by one or more of:
- a sub-band size on a current sub-band on which the MWU signal is transmitted;
- a mix of the sub-band size on the current sub-band on which the MWU signal is transmitted and a bitmap of the one or more sub-bands;
- a mix of a cluster size of a cluster of sub-bands, a cluster index, an indicator indicating a sub-band location in the cluster of sub-bands, and a bitmap of clustered sub-bands, wherein the clustered sub-bands are a subset of the one or more sub-bands; and
- a mix of a length of contiguous sub-bands, a location of a start of the contiguous sub-bands, and a sub-band size of a sub-band within the contiguous sub-bands.

8. The method of claim 1, wherein the availability of the one or more sub-bands is indicated in a payload of the MWU signal by a component carrier (CC) index and a sub-band index.

9. The method of claim 1, further including multiplexing channel state information-reference signal (CSI-RS) with the MWU signal.

10. The method of claim 1, wherein the MWU signal includes a pointer that points to different search space for users with different capabilities regarding carrier aggregation.

11. A method of wireless communication, comprising:
- receiving a multi-band wake-up (MWU) signal for one or more sub-bands in a serving cell that includes a first user and a second user, wherein the MWU signal includes a first user identifier that identifies the first user as a targeted receiver of the MWU signal;
- decoding a payload of the MWU signal;
- determining availability of the one or more sub-bands to the first user in the serving cell based on the payload of the MWU signal, wherein a clear channel assessment (CCA) on the one or more sub-bands that are available to the first user is clear, wherein the first user has priority over the second user in the serving cell to utilize the one or more sub-bands; and
- receiving a multi-band channel reservation (MCR) signal that is multiplexed with the MWU signal in frequency domain, wherein the MCR signal indicates an occupancy status of at least one of the one or more sub-bands by the first user, and includes a second user identifier that identifies the second user as a targeted receiver of the MCR signal.

12. The method of claim 11, further including disregarding the MCR signal.

13. The method of claim 11, wherein the receiving includes receiving the MWU signal on each of the one or more sub-bands.

14. The method of claim 11, wherein the availability of the one or more sub-bands is indicated in a payload of the MWU signal by one or more of:
- a sub-band size on a current sub-band on which the MWU signal is transmitted;
- a mix of the sub-band size on the current sub-band on which the MWU signal is transmitted and a bitmap of the one or more sub-bands;
- a mix of a cluster size of a cluster of sub-bands, a cluster index, an indicator indicating a sub-band location in the cluster of sub-bands, and a bitmap of clustered sub-bands, wherein the clustered sub-bands are a subset of the one or more sub-bands; and
- a mix of a length of contiguous sub-bands, a location of a start of the contiguous sub-bands, and a sub-band size of a sub-band within the contiguous sub-bands.

15. The method of claim 11, wherein the availability of the one or more sub-bands is indicated in a payload of the MWU signal by a component carrier (CC) index and a sub-band index.

16. An apparatus configured for wireless communication, the apparatus comprising:
- at least one processor; and
- a memory coupled to the at least one processor,
- wherein the at least one processor is configured:
  - to determine a multi-band wake-up (MWU) signal that indicates availability of one or more sub-bands to a first user in a serving cell, wherein a clear channel assessment (CCA) on the one or more sub-bands that are available to the first user is clear, wherein the MWU signal includes a first user identifier that identifies the first user as a targeted receiver of the MWU signal, wherein the first user has priority over a second user in the serving cell to utilize the one or more sub-bands;
  - to transmit the MWU signal for the one or more sub-bands in the serving cell; and
  - to determine a multi-band channel reservation (MCR) signal for each of the one or more sub-bands, wherein the MCR signal indicates an occupancy status of at least one of the one or more sub-bands by the first user, wherein the MCR signal includes a second user identifier that identifies the second user as a targeted receiver of the MCR signal.

17. The apparatus of claim 16, wherein the at least one processor is further configured to multiplex the MWU signal with the MCR signal in frequency domain.

18. The apparatus of claim 17, wherein the at least one processor is further configured to determine a waveform for the multiplexed MWU and MCR signals by determining a dynamic cyclic prefix (DCP) for an orthogonal frequency-division multiplexing (OFDM) symbol during which a payload of the MWU signal and a payload of the MCR signal are transmitted.

19. The apparatus of claim 18, wherein the determination is based on a time gap between CCA clearance and a start of transmission of the OFDM symbol and a time duration of a preamble of the MCR signal.

20. The apparatus of claim 16, wherein the at least one processor is further configured to perform a control channel resource set (Coreset) mapping based on the availability of the one or more sub-bands to the first user.

21. The apparatus of claim 16, wherein the at least one processor is configured to transmit the MWU signal on each of the one or more sub-bands.

22. The apparatus of claim 16, wherein the availability of the one or more sub-bands is indicated in a payload of the MWU signal by one or more of:
- a sub-band size on a current sub-band on which the MWU signal is transmitted;
- a mix of the sub-band size on the current sub-band on which the MWU signal is transmitted and a bitmap of the one or more sub-bands;
- a mix of a cluster size of a cluster of sub-bands, a cluster index, an indicator indicating a sub-band location in the cluster of sub-bands, and a bitmap of clustered sub-bands, wherein the clustered sub-bands are a subset of the one or more sub-bands; and
- a mix of a length of contiguous sub-bands, a location of a start of the contiguous sub-bands, and a sub-band size of a sub-band within the contiguous sub-bands.

23. The apparatus of claim 16, wherein the availability of the one or more sub-bands is indicated in a payload of the MWU signal by a component carrier (CC) index and a sub-band index.

24. The apparatus of claim 16, wherein the at least one processor is further configured to multiplex channel state information-reference signal (CSI-RS) with the MWU signal.

25. The apparatus of claim 16, wherein the MWU signal includes a pointer that points to different search space for users with different capabilities regarding carrier aggregation.

26. An apparatus configured for wireless communication, the apparatus comprising:
- at least one processor; and
- a memory coupled to the at least one processor,
- wherein the at least one processor is configured:
  - to receive a multi-band wake-up (MWU) signal for one or more sub-bands in a serving cell that includes a first user and a second user, wherein the MWU signal includes a first user identifier that identifies the first user as a targeted receiver of the MWU signal;
  - to decode a payload of the MWU signal;
  - to determine availability of the one or more sub-bands to the first user in the serving cell based on the payload of the MWU signal, wherein a clear channel assessment (CCA) on the one or more sub-bands that are available to the first user is clear, wherein the first user has priority over the second user in the serving cell to utilize the one or more sub-bands; and
  - to receive a multi-band channel reservation (MCR) signal that is multiplexed with the MWU signal in frequency domain, wherein the MCR signal indicates an occupancy status of at least one of the one or more sub-bands by the first user, and includes a second user identifier that identifies the second user as a targeted receiver of the MCR signal.

27. The apparatus of claim 26, wherein the at least one processor is further configured to disregard the MCR signal.

28. The apparatus of claim 26, wherein the at least one processor is configured to receive the MWU signal on each of the one or more sub-bands.

29. The apparatus of claim 26, wherein the availability of the one or more sub-bands is indicated in a payload of the MWU signal by one or more of:
- a sub-band size on a current sub-band on which the MWU signal is transmitted;
- a mix of the sub-band size on the current sub-band on which the MWU signal is transmitted and a bitmap of the one or more sub-bands;
- a mix of a cluster size of a cluster of sub-bands, a cluster index, an indicator indicating a sub-band location in the cluster of sub-bands, and a bitmap of clustered sub-bands, wherein the clustered sub-bands are a subset of the one or more sub-bands; and
- a mix of a length of contiguous sub-bands, a location of a start of the contiguous sub-bands, and a sub-band size of a sub-band within the contiguous sub-bands.

30. The apparatus of claim 26, wherein the availability of the one or more sub-bands is indicated in a payload of the MWU signal by a component carrier (CC) index and a sub-band index.

* * * * *